Feb. 11, 1969 B. T. McKEEVER 3,427,599
FAULT TOLERANT ADDRESSING CIRCUIT
Filed Dec. 23, 1965

INVENTOR
BRUCE T. McKEEVER
BY
Samuel E. Turner
ATTORNEY

INVENTOR
BRUCE T. McKEEVER
BY Samuel E. Turner
ATTORNEY

United States Patent Office 3,427,599
Patented Feb. 11, 1969

3,427,599
FAULT TOLERANT ADDRESSING CIRCUIT

Bruce T. McKeever, Sunnyvale, Calif., assignor to General Electric Company, a corporation of New York
Filed Dec. 23, 1965, Ser. No. 515,845
U.S. Cl. 340—173.1 6 Claims
Int. Cl. G11b 9/00; H03k 17/00

Figure 1:
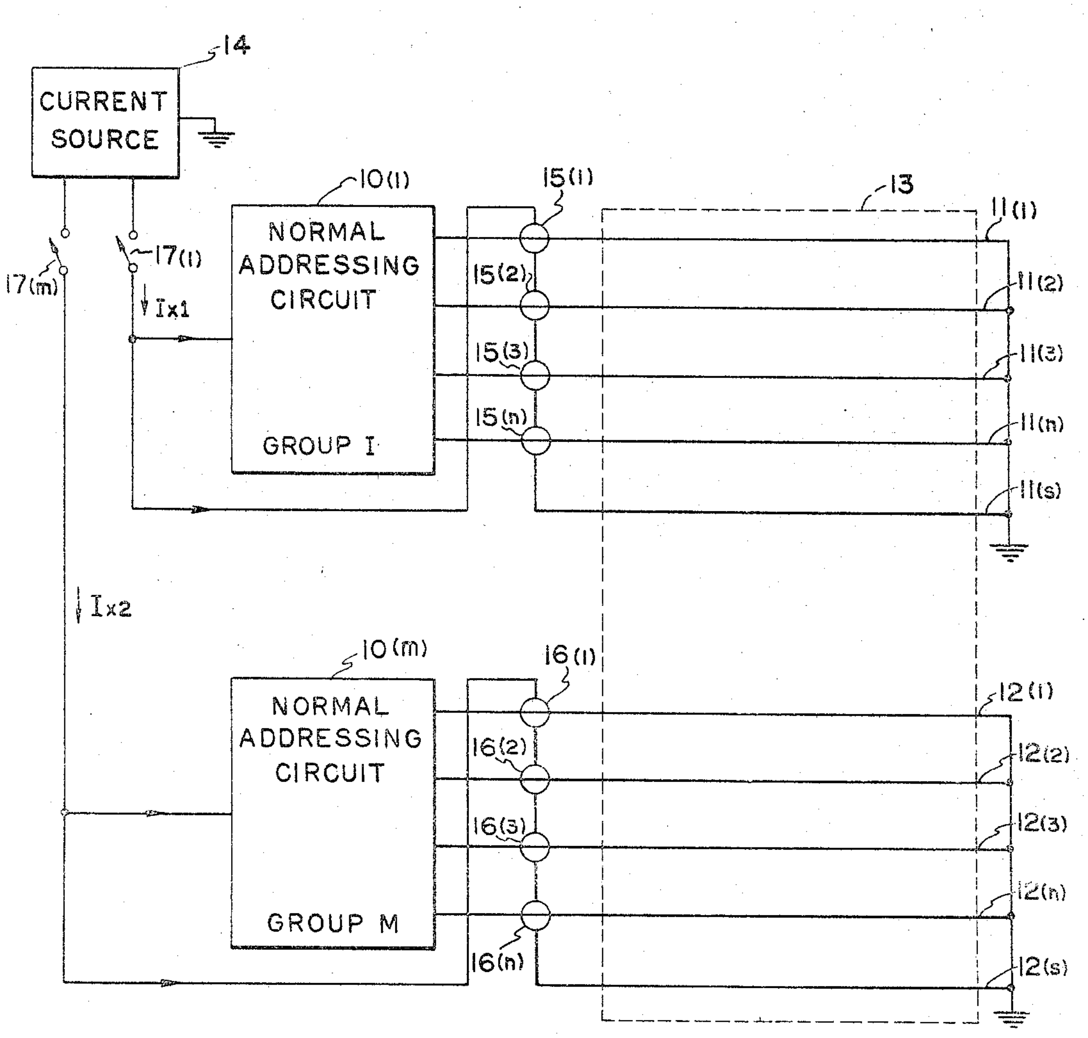

This invention relates to an addressing or selection circuit for memory systems of the superconductive type and particularly to location addressing circuits which provide tolerance to faults in such memory systems.

Because they may be fabricated by thin-film techniques, superconductive circuits are particularly advantageous for forming computer memories comprised of repetitive arrays of similar circuits. Because of low heat losses, superconductive circuitry can be greatly miniaturized and the packing density can be very high.

Thin film superconductive circuits are typically formed on a substrate or plate of limited size or area. Since superconductive circuits are presently operated in a liquid helium environment, the size of the substrates is limited by the practical size of the liquid helium container. Furthermore, present fabrication techniques usually involve multilayer vacuum deposition of superconductive and insulating materials through fine-line masks which become impractically fragile and flexible in large sizes. Thus, superconductive circuit systems are of practical necessity formed on a number of plates which are then positioned in stacked relationship with appropriate plate-to-plate interconnections.

Various types of superconductive memory systems have now been described including the following examples pertinent to the present invention:

A location-addressed word-organized superconductive memory formed of cryotron-controlled persistent-current storage cells is shown by J. W. Bremer, et al., in U.S. Patent No. 3,167,748 entitled, "Cryotron Memory," and assigned to the assignee of the present invention.

A random access, bit addressed superconductive memory of the continuous superconductive film (or continuous sheet) type is discussed by L. L. Burns, in an article entitled, "Cryoelectric Memories," Proceedings of the IEEE, vol. 52, No. 10, October 1964, pp. 1164–1176. Memories of this type provide bit addressing through two-dimensional (X and Y) coincident current selection in a manner analogous to the familiar magnetic core memory.

A bit-organized, random access memory system comprised of simplified persistent current storage cells is shown by V. L. Newhouse, et al., in copending U.S. patent application Ser. No. 419,430, filed Dec. 18, 1964, now Patent No. 3,359,545 assigned to the assignee of the present invention.

As exemplified by the foregoing references, the selection or addressing circuits of prior location addressed superconductive memories have taken the form of multilevel decoding trees formed of cryotron networks. These prior art selection tree arrangements are not well adapted to fault tolerance because operation of the cryotron elements of the tree is interdependent. Furthermore, each output line of the tree uniquely corresponds to a predetermined memory drive line. Thus a single fault in either a memory drive line or in the tree circuit will render an entire plate useless.

Because of the small size and high density of the circuit elements on a superconductive circuit plate there are many opportunities for faults to develop such as opens, shorts and departures from design tolerance. In fact, present experience indicates that only one of several fabricated plates can be expected to be completely free of faults, that most plates will contain a small number of faults and that a few plates will contain a large number of faults. As a practical matter, the cost of rejected plates must be charged to the accepted plates. Thus the problem of fault tolerance is one of economics. That is, if only perfect plates are acceptable, then the effective cost thereof will be very high since there will be many rejected plates. An increased yield (increased percentage of perfect plates) might be obtained at the sacrifice of circuit density. However, decreased circuit density also increases total cost by requiring a greater number of plates for a given amount of circuitry. It is therefore believed evident that it is desirable to provide tolerance to a small number of faults rather than to require perfect plates with the consequent necessity of discarding a large percentage of the fabricated plates.

In a copending U.S. patent application Ser. No. 500,-907, filed Oct. 22, 1965, by John W. Bremer and assigned to the assignee of the present invention there is disclosed an addressing or selection circuit formed of a plurality of series-connected, parallel-line bistable circuits of the J-cell type, each such J-cell controlling the drive current to a respective one of the drive lines of the memory. The operation of each selection J-cell circuit is independent of the other J-cells of the selection circuit; that is, each J-cell contains all of the address decoding cryotrons for its respective drive line or memory location. Thus, a faulty addressing J-cell or the J-cell corresponding to a faulty drive line or memory location can be disabled without affecting the operation of the other addressing J-cells.

Also disclosed in the above-mentioned patent application Ser. No. 500,907 is an arrangement of redundant or spare addressing J-cells and memory locations which are provided to replace the disabled addressing J-cells and corresponding memory locations. In this arrangement each spare memory location has associated therewith a special addressing J-cell having selectable address decoding which can be set to the address of the disabled memory location that the spare memory location replaces. In brief, each such special addressing J-cell includes a persistent current storage loop for each order of the address code. Persistent currents may be selectably stored in these loops whereby the special addressing J-cell responds to the desired address code.

It is desirable to provide a simpler arrangement for activating redundant memory locations and it is desirable to more automatically bring such redundant memory locations into play.

It is therefore the object of the present invention to automatically activate spare or redundant addressing circuits and corresponding memory locations in response to the failure of normal addressing circuits to address the normal memory locations.

This and other objects of the invention are achieved by arranging the selection circuits and corresponding memory locations of the memory in groups, each group including normal addressing circuits and, in accordance with the present invention, a special addressing circuit which provides access to redundant or spare memory locations in response to the failure of a normal address circuit of the group to properly function, the special addressing circuit including means for sensing whether or not the normal addressing circuit has properly functioned when addressed.

Figure 2:
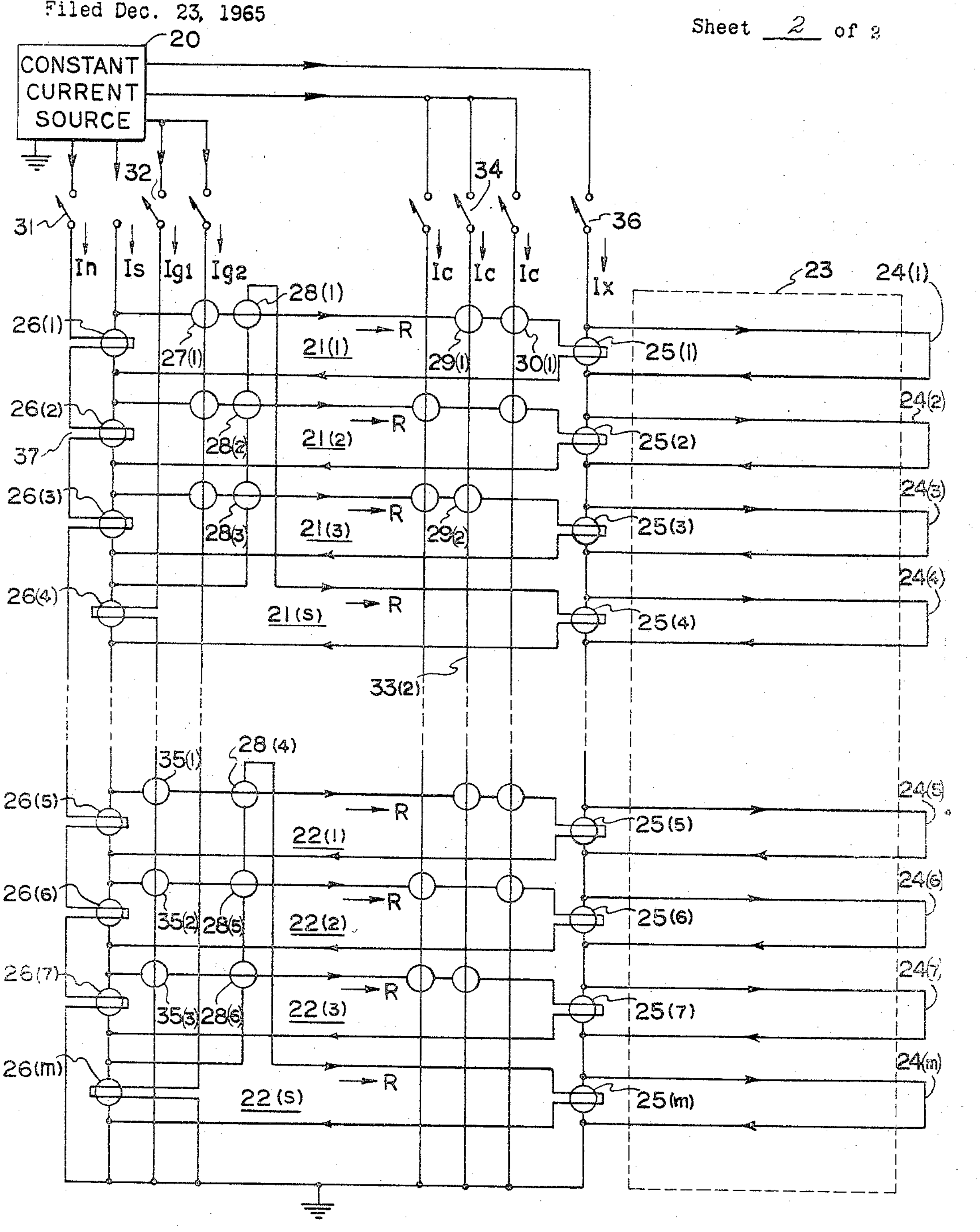

The selection circuit of the invention is described more specifically hereinafter with reference to the drawing wherein:

FIGURE 1 is a schematic illustration of a general embodiment of the invention; and FIGURE 2 is a schematic diagram of a preferred embodiment of the invention.

The selection or addressing circuit of the invention is formed of networks of superconductive switches called cryotrons. The operation of cryotron switches is based on the fact that certain electrical conductors exhibit a loss of electrical resistance at supercold temperatures approaching absolute zero and regain resistance in the presence of a certain critical magnetic field.

In the preferred thin-film form, the cryotron comprises a gate conductor film crossed by a narrow control conductor insulated therefrom. Both the gate conductor and the control conductor are normally in the superconducting state. If a sufficient current is caused to flow through the control conductor, the resulting magnetic field causes the gate conductor to become resistive in the region of the crossover. Thus, the cryotron comprises a two-state device, the gate being superconductive in the absence of a current in the control and the gate being resistive in the presence of a current in the control which exceeds a predetermined design threshold.

Schematically, a cryotron is illustrated herein as a circle crossed by a line, the circle representing the gate and the line representing the control thereof. (A more detailed discussion of cryotrons is given by John W. Bremer in "Superconductive Devices," McGraw-Hill Book Company, Inc., New York, 1962.)

A general embodiment of the invention is shown in FIG. 1. In accordance with the invention, the addressing circuits and corresponding drive lines are arranged in a plurality of groups, groups I and M being shown in FIG. 1, the normal addressing circuit for group I being represented by a block 10(1) and the normal addressing circuit for group M being represented by a block **10(*m*)**. The number of groups for a given size of memory is determined statistically based upon the observed yield, that is, upon the number of faults anticipated in view of actual fabrication experience.

The normal addressing circuit 10(1), for group I, normally directs a drive current I*x*1 through a selected one of a plurality of group I normal drive lines **11(1)–11(*n*). Similarly, the normal addressing circuit 10(*m*)** normally directs a drive current I*x*2 through a plurality of group M normal drive lines **12(1)–12(*n*). The normal addressing circuits 10(1)–10(*m*)** may be any well-known type for performing the above-stated function, such as the selection tree type of circuit shown in the previously mentioned article by Burns or the J-cell type of selection circuit shown in the previously mentioned application Ser. No. 500,907.

In accordance with the invention each group includes a spare addressing circuit and drive line, shown in FIG. 1 as a spare drive line **11(*s*) for group I and a spare drive line 12(*s*)** for group M.

The drive lines **11(1)–11(*n*), 11(*s*), 12(1)–12(*n*) and 12(*s*) traverse a memory plane 13** represented in dashed lines in FIG. 1.

The memory plane 13 may comprise a memory circuit of any known type having storage locations that are selected in response to the application of a drive current to a selected one of its drive lines. It is also noted that only the address circuitry for the X direction drive lines are shown herein. For use with a cryotron memory as shown, for example, in the previously mentioned Patent No. 3,167,748 only this one selection circuit is required. For use with coincident current memory, such as the continuous film memory, the address circuitry and the drive lines may be duplicated in the Y direction as is more fully explained in the previously mentioned patent application Ser. No. 500,907.

The spare drive line **11(*s*) is connected in parallel with the normal addressing circuit and the drive lines 11(1)–11(*n*) of group I. The drive line 11(*s*) includes the gates of a plurality of sensing cryotrons 15(1)–15(*n*) the control of each of which is connected in a respective one of the normal drive lines 11(1)–11(*n*). Thus current flow in any one of the drive lines 11(1)–11(*n*) renders the gate of the corresponding cryotron resistive and hence the spare drive line 11(*s*)** resistive.

A similar arrangement is provided for group M wherein the gates of a plurality of cryotrons **16(1)–16(*n*) are connected in spare drive line 12(*s*) whereby current flow in any of the drive lines 12(1)–12(*n*) renders the spare drive line 12(*s*)** resistive.

A well-known current source represented by a block 14 provides operating current for the circuit. A pair of switches 17(1) and **17(*m*) provide group selection by which the operating current may be applied to a selected one of the groups. Thus in the normal operation of the selection circuit of FIG. 1, to address one of the drive lines 11(1)–11(*n*) of group I for example, the switch 17(1)** is closed to apply the current I*x*1 and the normal addressing circuit 10(1) is operated to direct the drive current through the selected one of the normal drive lines. The drive current in the selected normal drive line flows through the control of the corresponding one of the sensing cryotrons **15(1)–15(*n*) and the spare drive line 11(*s*)** is thereby rendered resistive whereby flow of the current I*x*1 therethrough is prevented.

Suppose however that the normal addressing circuit 10(1) fails to direct a drive current through any of the drive lines **11(1)–11(*n*). In this event the gates of all of the sensing cryotrons 15(1)–15(*n*) remain superconductive and hence the spare drive line 11(*s*)** remains superconductive. In this case the current I*x*1 flows through the spare drive line **11(*s*)** thus accessing the spare memory locations traversed thereby.

It is thus seen that the failure of the normal addressing circuit to direct a drive current through a selected normal drive line automatically results in drive current flow through the spare drive line of the group. It is contemplated that for certain types of faults, such as faulty memory locations, the corresponding drive line will be deliberately opened so that the spare memory locations will be selected instead.

Shown schematically in FIG. 2 is a preferred embodiment of the invention using addressing circuits of the type described in the previously mentioned patent application Ser. No. 500,907.

Thus in basic form the addressing circuits of the selection arrangement of FIG. 2 comprise cryotron networks known as J-cells. Briefly, a two-line J-cell comprises a pair of normally superconductive lines connected in parallel to which is applied a constant operating current. Input cryotrons, having the gates thereof included in the J-cell lines, can be controlled to selectively direct the operating current through one or the other of the J-cell lines. Output cryotrons, having the controls thereof, included in the J-cell lines detect the path of the operating current. The operating of a J-cell circuit is based upon the fact that a current once established in a selected one of parallel superconductive paths remain in the selected path until diverted therefrom even through parallel paths are thereafter allowed to become superconductive. Thus the operating current applied to a two-line J-cell remains in the line through which it is directed until diverted therefrom even though the other line of the J-cell is allowed to become superconductive. (Further details of J-cells circuits may be found in the previously mentioned "Superconductive Devices.")

In accordance with the embodiment of FIG. 2 the J-cell selection circuits for addressing the memory locations of a memory or data storage system are arranged in groups with each group including a special addressing J-cell for selecting a redundant or spare memory location in response to a sensing of the failure of the normal addressing J-cells of the group to function when addressed.

Two groups of addressing J-cells of a selection circuit are shown in FIG. 2. The first group comprises a plurality of normal addressing J-cells 21(1)–21(3) and a special addressing J-cell **21(*s*). The second group comprises a plurality of normal addressing J-cells 22(1)–22(3) and a special addressing J-cell 22(*s*)**.

A current source 20 provides operating currents for the circuit including a drive current I*x*, a plurality of address decoding currents I*c*, a plurality of group selection currents I*g*1 and I*g*2, a selection current I*s* and a reset current I*r*.

Shown to the right in the drawing, with dashed lines, is a memory plane 23 traversed by a plurality of superconductive drive lines **24(1)–24(*m*)** each of the latter forming a loop across the memory plane.

Each of the drive lines **24(1)–24(*m*) is shunted by the gate of a respective one of a plurality of drive current directing cryotrons 25(1)–25(*m*)**. The gates of these cryotrons thus provide alternate paths for the drive current I*x*. It is arranged that the inductance of the path through these gates is much less than the inductance of the loops comprising the drive lines. Thus if the gates of the cryotrons **25(1)–25(*m*)** are superconductive when the drive current I*x* is applied, the substantial portion of the drive current flows through these gates and not through the drive lines. This is in accordance with the principle that a current applied to parallel superconductive paths divides in inverse proportion to the inductance of the paths. When the gate of one of the cryotrons **25(1)–25(*m*)** is rendered resistive, the applied drive current I*x* is directed through the corresponding drive line.

The controls of the cryotrons **25(1)–25(*m*) are in the circuits of the addressing J-cells whereby the selection circuit controls the states of the cryotrons 25(1)–25(*m*)** to thereby direct the applied drive current I*x* through a selected one of the drive lines **24(1)–24(*m*)**.

Each of the addressing J-cells **21(1)–21(*s*) and 22(1)–22(*s*) comprises a normally superconductive loop, indicating as a reset path R, shunted by the gate of a respective one of a plurality of reset cryotrons 26(1)–26(*m*)**. It is preferably arranged that the path R has substantially greater inductance than the path through the reset gate across which it is connected.

The path R of each of the normal addressing J-cells 21(1)–21(3) and 22(1)–22(3) includes the gates of group selection and address decoding cryotrons, the control of a sensing cryotron for the special addressing J-cell of the group and the control of a respective one of the drive current directing cryotrons. For example, the reset path R of the normal addressing J-cell 21(1) contains the gate of a group selection cryotron 27(1), the control of a sensing cryotron 28(1), the gates of a plurality of address decoding cryotrons 29(1) and 30(1) and the control of the drive current directing cryotron 25(1).

The reset path R of each of the special addressing J-cells contains the gates of a plurality of sensing cryotrons and the control of the drive current directing cryotron of a spare or redundant drive line. For example, the reset path R of the special addressing J-cell **21(*s*) includes the gates of a plurality of sensing cryotrons 28(1)–28(3) (each having its control in a respective reset path R of the normal addressing J-cells of the group) and the control of drive current directing cryotron (25(4)**.

The following examples illustrate the operation of the selection circuit of FIG. 2. Assuming by way of example that it is desirable to select the drive line 24(2), the normal operation of the circuit is as follows: The selection current I*s* is continually applied. A switch 31 is temporarily closed to apply the reset current I*r*. This reset current I*r* flows through the controls of cryotrons 26(1)–26(3) and 26(5)–26(7) whereby the gates of these cryotrons are rendered resistive. These resistive gates cause the selection current I*s* to flow through the reset paths R of the normal addressing J-cells 21(1)–21(3) and 22(1)–22(3). The current I*s* in the reset paths of the normal addressing J-cells flows through the controls of sensing cryotrons 28(1)–28(6) thus directing the selection current I*s* through the gates of reset cryotrons 26(4) and 26(m) of the special addressing J-cells. The path of the selection current I*s* is thus as follows: through the reset paths R of J-cells 21(1)–21(3), through the gate of cryotron 26(4), through the reset paths R of J-cells 22(1)–22(3) and through the gate of cryotron **26(*m*)**.

When the current I*s* is thus established the switch 31 is opened to remove the reset current I*r*. For selection of drive line 24(2), group selection current I*g*1 is temporarily applied by closing a switch 32 and an address decoding current I*c* is temporarily applied to an address decoding line 33(2) by closing a switch 34. The address decoding current I*c* on line 33(2) flows through the controls of cryotrons 29(1) and 29(2) thus rendering the gates thereof resistive whereby the selection current I*s* is diverted from the reset paths R of addressing J-cells 21(1) and 21(3). The group selection current I*g*1 flows through the controls of a plurality of group selection cryotrons 35(1)–35(3) the gates of which are rendered resistive to divert the selection current I*s* from the reset paths R of the normal addressing J-cells 3(1)–3(3) of the second group.

The group selection current I*g*1 also flows through the control of cryotron 26(4). The consequent resistive condition of the gate of cryotron 26(4) attempts to direct the selection current I*s* through the reset path R of the special addressing J-cell **21(*s*). However the gate of sensing cryotron 28(2)** is also resistive due to the current I*s* in the reset path R of J-cell 21(2) and thus the path of the selection current I*s* through the special J-cell **2(*s*)** is presently indeterminate.

Switches 32 and 34 are now opened to remove the group selection current I*g*1 and the decoding current I*c* from line 33(2). The path of the selection current is now as follows: through the gate of reset cryotron 26(1), through the reset path R of addressing J-cell 21(2) and through the gates of reset cryotrons **26(3)–26(*m*). The selection current in the reset path R of addressing J-cell 21(2) flows through the control of drive current directing cryotron 25(2) whereby the gate thereof is rendered resistive. However, the gates of the other drive current directing cryotrons 25(1) and 25(3)–25(*m*) are superconductive. Thus when a switch 36** is now closed to apply the drive current, the drive current I*x* flows through the superconductive gate of cryotron 25(1), it is directed through the one selected drive line 24(2) by the resistive state of cryotron 25(2) and it flows thence through the superconductive gates of cryotrons **25(3)–25(*m*)**.

The foregoing describes the normal operation of the selection circuit in the selection of one of a plurality of drive lines. Suppose however that the addressing J-cell 21(2) is faulty or that the drive line 24(2), or a memory location associated therewith, is faulty. In this event, and in accordance with the invention, the J-cell 21(2) may be disabled to prevent the flow of the selection current I*s* in its reset path R. The disablement of the J-cell 21(2) may be accomplished in several ways including the opening of its reset path R. Alternatively or in addition to prevent resistive power loss it is desirable to provide a superconductive jumper of low inductance across the control of its reset cryotron 26(2) at a point indicated by 37 so that the gate of cryotron 26(2) remains superconductive at all times.

In the foregoing example of normal operation it will be recalled that with the group selection current I*g*1 applied there was an indeterminate condition of selection current I*s* flow in the special J-cell **21(*s*) due to the fact that the gates of both cryotrons 26(4) and 28(2) were resistive at the same time. With the addressing J-cell 21(2) disabled, the gate of cryotron 28(2)** remains superconductive and, in this case, the selection current I*s* is directed through the reset path R of the special addressing J-cell **21(*s*)**.

Thus, assuming that the normal addressing J-cell 21(2) is disabled and assuming the same sequence of operation described hereinbefore, when the group selection current I*g*1 and the decoding current I*c* (on line 33(2) are removed, the path of the selection current $I_s$ is as follows: through the gates of cryotrons 26(1)–26(3), through the reset path R of special addressing cryotron 21(*s*) and through the gates of cryotrons 26(5)–26(*m*). The selection current $I_s$ in the reset path R of the special addressing J-cell 21(*s*) flows through the control of drive current directing cryotron 25(4) whereby the gate thereof is rendered resistive to direct the applied drive current $I_x$ through the redundant or spare drive line 24(4). In other words, when a group is addressed the special addressing J-cell responds if, and only if, none of the normal addressing J-cells of the group respond to the address, the response of the special J-cell being controlled by sensing cryotrons (such as cryotrons 28(1)–28(3)) in the reset paths of the normal addressing J-cells.

Thus what has been described is a selection circuit which automatically provides access to redundant or spare memory locations in response to the failure of the circuit to provide access to normal memory locations.

While the principles of the invention have been made clear in the illustrative embodiments, there will be obvious to those skilled in the art, many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a superconductive memory having a plurality of memory drive lines, the combination of: a respective addressing circuit for each of said drive lines, said addressing circuits being arranged in a plurality of groups, each group including a plurality of normal addressing circuits and a special addressing circuit; means for applying an address representation corresponding to a selected drive line to said normal addressing circuits, said normal addressing circuits being normally responsive to said address representation for addressing said selected drive line, said special addressing circuit being responsive to the failure of a normal addressing circuit to address said selected drive line for addressing the drive line corresponding to said special addressing circuit.

2. In a superconductive memory having a plurality of memory drive lines said drive lines being arranged in groups including a plurality of normal drive lines and a spare drive line in each group, a selection circuit for addressing a selected drive line, comprising: a plurality of groups of addressing circuits, each group including a respective normal addressing circuit for each normal drive line and a special addressing circuit for said spare drive line, each addressing circuit including first and second parallel connected normally superconductive lines; means for applying a selection current to said addressing circuits; means responsive to said selection current in said first line of each said addressing circuit for addressing the respectively corresponding drive line; a plurality of address control lines traversing the lines of said normal addressing circuits, each address control line corresponding to a respective order of an address code; a respective plurality of address decoding cryotrons having the gates thereof included in said first line of each said normal addressing circuits and having the controls thereof included in a unique combination of said address control lines; a plurality of cryotrons having the gates thereof connected in the said first line of each of said special addressing circuits and having the controls thereof each connected in a respective first line of the normal selection circuits of the group; and means for selectably rendering resistive said second lines of said special addressing circuits.

3. In a memory system having a plurality of drive lines for addressing memory locations, the combination of: a plurality of normal drive lines, said drive lines being arranged in groups; a spare drive line for each of said groups; a plurality of groups of addressing circuits, each group including a respective normal addressing circuit for each normal drive line of the group and a special addressing circuit for said spare drive line of the group, each said addressing circuit having first and second states and each being operable in its second state to direct a drive current through its associated drive line; means for selecting one of said groups; and sensing means in each group for sensing the states of said normal addressing circuits of its group and operable in response to the detection of said first state of all of the normal addressing circuits of said selected group for placing said special addressing circuit of said selected group in said second state.

4. In a memory system having a plurality of drive lines for addressing memory locations, the combination of: a plurality of normal drive lines for addressing a plurality of normal memory locations; a selection circuit normally operable to direct a drive current through a selected one of said normal drive lines; a spare drive line for addressing spare memory locations; and means operable in response to the failure of said selection circuit to address a normal drive line for directing a drive current through said spare drive line.

5. In a memory system having a plurality of drive lines for addressing memory locations, the combination of: a plurality of drive lines for addressing a plurality of normal memory locations; an addressing circuit normally operable to direct a drive current through a selected one of said normal drive lines; sensing means for sensing the failure of said addressing circuit to direct said drive current through said selected normal drive line; a spare drive line for addressing spare memory locations; and means controlled by said sensing means for directing a drive current through said spare drive line.

6. In a memory system having a plurality of drive lines for addressing memory locations, the combination of: a plurality of normal drive lines, said drive lines being arranged in a plurality of groups; a spare drive line for each of said groups; an addressing circuit for each of said groups; means for selecting one of said groups; means for applying address signals to the addressing circuit of said selected group, said addressing circuit being normally operable in response to said address signals to direct a drive current through the normal drive line corresponding to said address signals; sensing means in each of said groups for detecting the failure of said addressing circuit of said selected group to direct said drive current through any one of the normal drive lines of said selected group; and means controlled by said sensing means for directing a drive current through said spare drive line of said selected group.

References Cited

UNITED STATES PATENTS

| | | | |
|---|---|---|---|
| 3,175,198 | 3/1965 | Burns | 340—173.1 |
| 3,230,391 | 1/1966 | Ahrons | 340—173.1 |

TERRELL W. FEARS, *Primary Examiner.*

U.S. Cl. X.R.

307—245